US010102175B2

(12) United States Patent
Breece, III et al.

(10) Patent No.: US 10,102,175 B2
(45) Date of Patent: Oct. 16, 2018

(54) METHODS AND APPARATUS FOR MULTI-DROP DIGITAL BUS

(71) Applicant: Apple Inc., Cupertino, CA (US)

(72) Inventors: David Breece, III, Sunnyvale, CA (US); James Hollabaugh, San Jose, CA (US); Kirill Kalinichev, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 605 days.

(21) Appl. No.: 14/216,370

(22) Filed: Mar. 17, 2014

(65) Prior Publication Data

US 2014/0281076 A1    Sep. 18, 2014

Related U.S. Application Data

(60) Provisional application No. 61/799,016, filed on Mar. 15, 2013.

(51) Int. Cl.
*G06F 13/42* (2006.01)
*G06F 13/40* (2006.01)

(52) U.S. Cl.
CPC .......... *G06F 13/42* (2013.01); *G06F 13/4072* (2013.01)

(58) Field of Classification Search
CPC .................................................. G06F 13/4072
USPC ........................................................ 710/106
See application file for complete search history.

(56) References Cited

U.S. PATENT DOCUMENTS

| 3,177,292 A | * | 4/1965 | Ewin | H04Q 3/58 379/334 |
| 3,755,628 A | * | 8/1973 | Games | H04L 1/02 370/445 |
| 4,083,005 A | * | 4/1978 | Looschen | H04L 25/49 375/257 |
| 4,087,643 A | * | 5/1978 | Joslow | H04M 9/025 370/212 |
| 4,099,028 A | * | 7/1978 | Towson, IV | H04J 3/24 370/389 |
| 4,216,426 A | * | 8/1980 | Flora | H04L 25/4925 375/257 |

(Continued)

FOREIGN PATENT DOCUMENTS

| EP | 0691617 A2 | 1/1996 |
| EP | 1427121 A1 | 6/2004 |

(Continued)

OTHER PUBLICATIONS

IEEE Draft Standard P802.11v /D6.01.

(Continued)

*Primary Examiner* — Paul R Myers
(74) *Attorney, Agent, or Firm* — Gazdzinski & Associates, PC (57) ABSTRACT

Apparatus and methods for digital bus operation. In one embodiment, the digital bus is a bidirectional, time-division multiplexing (TDM) audio bus operation, and a bus technology is described that enables multi-drop (e.g., multiple device, multiple node, etc.) connectivity for real-time audio over a small form factor interface (e.g., as few as two (2) wires). Specifically, an exemplary tri-level signaling scheme provides bidirectional functionality, real-time clock edges, audio data, in a multi-drop topology in one implementation.

18 Claims, 9 Drawing Sheets

(56) References Cited

U.S. PATENT DOCUMENTS

| | | | | |
|---|---|---|---|---|
| 4,280,221 A * | 7/1981 | Chun | G08C 19/16 | 375/257 |
| 4,500,989 A * | 2/1985 | Dahod | H04L 12/28 | 370/431 |
| 4,527,266 A | 7/1985 | Bogan et al. | | |
| 4,543,654 A * | 9/1985 | Jones | H04L 12/2801 | 370/445 |
| 4,550,400 A * | 10/1985 | Henderson, Jr. | H03G 1/02 | 370/458 |
| 4,554,658 A * | 11/1985 | Marten | H04M 3/60 | 370/458 |
| 4,561,118 A * | 12/1985 | Thinschmidt | H04L 12/44 | 398/60 |
| 4,701,904 A * | 10/1987 | Darcie | H04H 20/69 | 398/118 |
| 4,730,268 A * | 3/1988 | Marin | G06F 13/37 | 710/119 |
| 4,745,597 A * | 5/1988 | Morgan | H04L 12/423 | 370/224 |
| 4,773,065 A * | 9/1988 | Kobayashi | H04J 3/0682 | 370/362 |
| 4,785,396 A * | 11/1988 | Murphy | H04L 12/413 | 370/447 |
| 4,797,877 A * | 1/1989 | Pope | H04M 3/561 | 370/261 |
| 4,860,309 A * | 8/1989 | Costello | H04L 12/413 | 326/56 |
| 5,160,929 A * | 11/1992 | Costello | H03M 5/18 | 341/57 |
| 5,210,846 A * | 5/1993 | Lee | G06F 3/0383 | 235/492 |
| 5,237,322 A * | 8/1993 | Heberle | H04L 12/4135 | 340/870.13 |
| 5,357,511 A * | 10/1994 | DiNapoli | H04H 60/04 | 370/263 |
| 5,448,311 A * | 9/1995 | White | H04N 5/148 | 330/254 |
| 5,469,431 A * | 11/1995 | Wendorf | H04H 60/25 | 348/E7.017 |
| 5,487,066 A * | 1/1996 | McNamara | H04L 12/2801 | 370/410 |
| 5,621,735 A * | 4/1997 | Rochester, Jr. | H04Q 9/00 | 370/346 |
| 5,640,399 A * | 6/1997 | Rostoker | H04L 12/4625 | 370/392 |
| 5,661,583 A * | 8/1997 | Nhu | H04B 10/502 | 375/257 |
| 5,754,764 A * | 5/1998 | Davis | G06F 13/385 | 709/200 |
| 6,061,604 A * | 5/2000 | Russ | G05B 19/0421 | 340/539.22 |
| 6,272,130 B1 * | 8/2001 | Panahi | H04J 3/1605 | 370/366 |
| 6,393,020 B1 | 5/2002 | Patton | | |
| 6,425,009 B1 * | 7/2002 | Parrish | H04L 12/2697 | 370/216 |
| 6,532,274 B1 | 3/2003 | Ruffini | | |
| 6,542,754 B1 | 4/2003 | Sayers et al. | | |
| 6,608,571 B1 * | 8/2003 | Delvaux | G06F 13/4295 | 341/53 |
| 6,766,381 B1 * | 7/2004 | Barker | H04L 29/06 | 709/246 |
| 6,965,299 B1 | 11/2005 | Daily et al. | | |
| 7,295,578 B1 * | 11/2007 | Lyle | G06F 3/14 | 348/473 |
| 7,643,595 B2 | 1/2010 | Aweya et al. | | |
| 7,792,158 B1 | 9/2010 | Cho et al. | | |
| 8,095,175 B2 * | 1/2012 | Todd | H04W 36/18 | 370/328 |
| 8,149,880 B1 | 4/2012 | Cho et al. | | |
| 8,521,101 B1 * | 8/2013 | Kadam | H04L 7/04 | 375/350 |
| 2001/0004366 A1 | 6/2001 | Matsumura et al. | | |
| 2002/0012401 A1 * | 1/2002 | Karolys | G08C 15/02 | 375/257 |
| 2002/0154647 A1 * | 10/2002 | Potash | H04J 3/0623 | 370/412 |
| 2003/0078006 A1 * | 4/2003 | Mahany | G06F 1/163 | 455/63.1 |
| 2003/0115369 A1 * | 6/2003 | Walter | H04L 12/4035 | 709/253 |
| 2004/0001007 A1 * | 1/2004 | Inoue | H04L 29/1232 | 340/9.1 |
| 2004/0022210 A1 | 2/2004 | Frank et al. | | |
| 2004/0208200 A1 * | 10/2004 | Hejdeman | H04L 7/044 | 370/476 |
| 2004/0240404 A1 | 12/2004 | Ibrahim et al. | | |
| 2005/0057307 A1 * | 3/2005 | Zhang | H03F 3/3022 | 330/264 |
| 2005/0069318 A1 * | 3/2005 | Lee | H04J 14/0226 | 398/67 |
| 2005/0088443 A1 | 4/2005 | Blanco et al. | | |
| 2005/0141565 A1 | 6/2005 | Forest et al. | | |
| 2006/0187969 A1 * | 8/2006 | Kadowaki | H04L 5/16 | 370/516 |
| 2007/0211686 A1 * | 9/2007 | Belcea | H04L 41/00 | 370/345 |
| 2007/0291777 A1 * | 12/2007 | Jamieson | G01D 5/00 | 370/401 |
| 2008/0240021 A1 | 10/2008 | Guo et al. | | |
| 2008/0287153 A1 | 11/2008 | Fullam | | |
| 2008/0315934 A1 * | 12/2008 | Engl | G06F 1/22 | 327/306 |
| 2009/0077277 A1 * | 3/2009 | Vidal | G06F 1/3203 | 710/46 |
| 2009/0161655 A1 | 6/2009 | Uppala | | |
| 2010/0254345 A1 * | 10/2010 | Raravi | H04W 36/30 | 370/331 |
| 2011/0191512 A1 * | 8/2011 | Beccue | G06F 1/06 | 710/110 |
| 2011/0216816 A1 | 9/2011 | Frenzel | | |
| 2011/0228888 A1 | 9/2011 | Gelter et al. | | |
| 2011/0231566 A1 * | 9/2011 | Gelter | H04L 49/90 | 709/231 |
| 2011/0286442 A1 | 11/2011 | Maurice et al. | | |
| 2012/0001657 A1 | 1/2012 | Sullivan et al. | | |
| 2012/0020417 A1 | 1/2012 | Wei et al. | | |
| 2012/0144078 A1 * | 6/2012 | Poulsen | G06F 13/423 | 710/105 |
| 2012/0326768 A1 * | 12/2012 | Bhattacharya | H03F 1/308 | 327/524 |
| 2013/0188657 A1 | 7/2013 | Nedovic et al. | | |
| 2013/0301634 A1 | 11/2013 | Ehlers et al. | | |
| 2013/0301635 A1 | 11/2013 | Hollabaugh et al. | | |
| 2013/0343365 A1 | 12/2013 | Hollabaugh et al. | | |
| 2014/0068107 A1 | 3/2014 | Rajapakse | | |
| 2014/0247834 A1 * | 9/2014 | Poulsen | H04L 7/0066 | 370/458 |

FOREIGN PATENT DOCUMENTS

| | | |
|---|---|---|
| WO | WO-2010083930 A1 | 7/2010 |
| WO | WO-2012065823 A1 | 5/2012 |

OTHER PUBLICATIONS

IEEE Standard for Local and Metropolitan Area Networks—Timing and Synchronization for Time-Sensitive Applications in Bridged Local Area Networks.

Loeb, et al., "Implementing a Softawre-Based 802.11 MAC on a Customized Platform" CCNC 2009. 6t IEEE, Piscataway, NJ Jan. 2009.

Youssef, at al., "PinPoint: An Asynchronous Time-Based Location Determination System", ACM 2 Penn Plaza, Jun. 2006.

\* cited by examiner

METHODS AND APPARATUS FOR MULTI-DROP DIGITAL BUS

PRIORITY

This application claims priority to co-owned, U.S. Provisional Patent Application Ser. No. 61/799,016 filed Mar. 15, 2013 and entitled "METHODS AND APPARATUS FOR MULTI-DROP DIGITAL BUS", the foregoing being incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of digital bus technologies, and more particularly in one exemplary embodiment to real-time digital audio bus operation.

2. Description of Related Technology

Certain industrial design considerations are particularly important for consumer electronics devices; these typically include cost, size and power consumption. Device manufacturers constantly seek to improve and optimize device designs to match evolving consumer tastes. One area which has significant perceptible impact is digital audio bus construction.

As a brief aside, digital audio devices record, store, and reproduce sound by converting audio signals to/from digital signals. Existing consumer electronics devices are commonly equipped to multiple digital audio peripherals. Common examples of such digital audio peripherals include for example, speakers, headsets, microphones, audio recorders, etc.

The ubiquity of digital audio devices has provided a unique opportunity for exciting new device capabilities and uses. Such capabilities may include e.g., audio device networking, lightweight device peripherals, etc. Unfortunately, existing digital audio bus technologies require significant device "real estate" (i.e., pins and packaging), which limits aggressive form factor designs. Consequently, new and improved digital audio bus technologies are needed.

SUMMARY

The present disclosure satisfies the aforementioned needs by providing, inter alga, improved apparatus and methods relating to methods and apparatus for real-time digital audio bus operation.

In one aspect, a digital bus architecture is disclosed. In one embodiment, the architecture includes a bidirectional, time-division multiplexing (TDM) signaling protocol, wherein the protocol enables multi-drop connectivity for real-time digital data over an interface. In one variant, the architecture further includes a tri-level signaling scheme configured to enables a first bus node to provide clock and data signals to one or more other bus nodes, and/or receive clock and data signals from any of the other bus nodes.

In another embodiment, the digital bus architecture includes: a time-division multiplexing (TDM) signaling protocol configured to transmit a clock signal comprising real-time digital data, the clock signal configured to enable multi-drop connectivity for the real-time digital data over an interface.

In another aspect, a digital audio network is disclosed. In one embodiment, the network includes one or more bus nodes, each node which may comprise one or more audio sources and audio sinks, the network configured to operate according to the method comprising a bus node arbitrating for control of the audio network, and transmitting a real-time clock with edge transitions, and data with logic levels. In one variant, the bus node receives clock and data from any of the bus nodes of the network.

In another aspect, a method of operating a digital audio network comprising one or more bus nodes, wherein each node comprises one or more audio sources and/or audio sinks. In one embodiment, the method includes arbitrating for control of the audio network, receiving audio data to be transmitted to at least one of the one or more bus nodes, and transmitting a real-time clock with edge transitions and logic levels, where the real-time clock is configured based at least on the received audio data.

In a further aspect, a simplified digital data interface is disclosed. In one embodiment, the interface includes: a two-wire signaling conductor interface; and logic configured to implement a time-divided transmission protocol over the conductor interface so as to enable single-ended signaling for the transmission of digital data.

In another embodiment, simplified digital data interface includes a two-wire signaling conductor interface, and logic configured to implement a time-divided transmission protocol over the conductor interface so as to enable single-ended signaling for the reception of digital audio data.

Other features and advantages described herein will immediately be recognized by persons of ordinary skill in the art with reference to the attached drawings and detailed description of exemplary embodiments as given below.

All Figures©Copyright 2012-2014 Apple Inc. All rights reserved.

DETAILED DESCRIPTION

Reference is now made to the drawings wherein like numbers refer to like parts throughout.

Overview

Within the context of consumer devices, increasing smaller device form factors drive component size requirements. Digital bus technologies (such as audio buses) have a significant impact on overall device size. For example, in addition to overall component size (e.g., an audio IC), routing signals through a congested circuit board also adds to overall circuit board size. To these ends, various embodiments of the present invention are directed to reducing digital bus size and capabilities. In particular, a bidirectional, time-division multiplexing (TDM) signaling protocol enables multi-drop (e.g., multiple device, multiple node, etc.) connectivity for real-time audio over a small form factor interface. For example, one tri-level signaling scheme is disclosed which enables a first bus node to provide clock and data signals to one or more other bus nodes and/or receive clock and data signals from any of the other bus nodes.

As described hereinafter, the exemplary digital audio network includes one or more bus nodes, where each node may have one or more audio sources and audio sinks. During operation, a bus node can arbitrate for control of the audio network, and transmit a real-time clock with edge transitions (i.e., on either rising edges or falling edges), and data with logic levels (e.g., logic high, logic low). Alternately, the bus node can receive clock and data from any of the bus nodes of the network. The relative simplicity of circuit construction for bus nodes can advantageously support inexpensive component and peripheral manufacture. Similarly, the flexibility of bidirectional audio bus signaling enables nodes to coordinate with other nodes for a wide range of functionality and/or capabilities.

DETAILED DESCRIPTION OF EXEMPLARY EMBODIMENTS

Exemplary embodiments are now described in detail. While these embodiments are primarily discussed in the context of a digital audio bus, it is appreciated that various principles described herein have broader applicability. For example, similar systems may be used by for e.g., digital multimedia (video and audio applications), and/or other lightweight real-time applications.

Existing Digital Audio Technologies—

Existing solutions for digital audio technologies have been designed to accommodate a wide variety of use scenarios. For example, the two most common digital audio bus technologies are: S/PDIF (Sony/Philips Digital Interconnect Format), and USB (Universal Serial Bus).

S/PDIF provides high data-rate digital audio bus technology which can operate over reasonably short distances. Traditionally used in home theaters and other digital high fidelity systems, S/PDIF is based on the AES3 interconnect standard, and can carry channels of pulse code modulation (PCM) audio, or alternately a multi-channel compressed surround sound format (e.g., Digital Theater System (DTS), Dolby Digital, etc.). Unfortunately, S/PDIF is limited to unidirectional links and requires significant receiver complexity. Specifically, S/PDIF only supports a single audio source that generates frames of audio data. The framed audio data is decoded by the audio sink. Due to the limited formatting constraints for S/PDIF, S/PDIF is limited to point-to-point connections and cannot support more complex topologies (such as is required for audio networking).

USB is a generic digital bus technology which is based on a master/slave topology. USB has become the de facto standard for computer peripherals and is commonly used in many digital audio applications. However, USB is based on bulk packetized data transfers which are not suitable for certain applications. In particular, so-called "real-time audio" applications require delivery guarantees which are more stringent than USB "best effort" delivery. Since a momentary data gap in real-time audio applications will result in a perceptible "click" or other audio artifact, USB audio solutions traditionally rely on large audio data buffers as a safety margin. Additionally, USB devices are not guaranteed to be time synchronized which can result in undesirable lags, etc. during playback.

Finally, while USB is considered "lightweight" in computing peripherals, in the context of audio devices USB is a very complex bus technology (minimal requirements for USB slave operation include a processor and significant hardware clock overhead e.g., phase locked loops (PLLs), delay locked loops (DLLs), etc.).

In view of existing digital (audio) bus technologies and their limitations, new and improved solutions for bidirectional audio bus operation are needed. Ideally, such solutions should provide bidirectional capability and multiplexing support, while still minimizing bus interface requirements (e.g., physical pin requirements, protocol complexity, etc.).

Apparatus—

The following discussions separately describe an audio source apparatus and audio sink apparatus for clarity; however, it is appreciated that in actual implementation such capabilities can, and generally do, coexist within the same node and/or device. For example, an audio headset transmits and receives audio data. In other examples, a single device may internally house a so-called "multi-drop" network of audio capable nodes (e.g., multiple speakers, combination with multiple audio processors, etc.).

Additionally, while the media described is primarily audio data, it is appreciated that various principles described herein are applicable to other forms of media including without limitation: video, images, text, streaming data (e.g., such as is used in high performance gaming, etc.).

Figure 1:
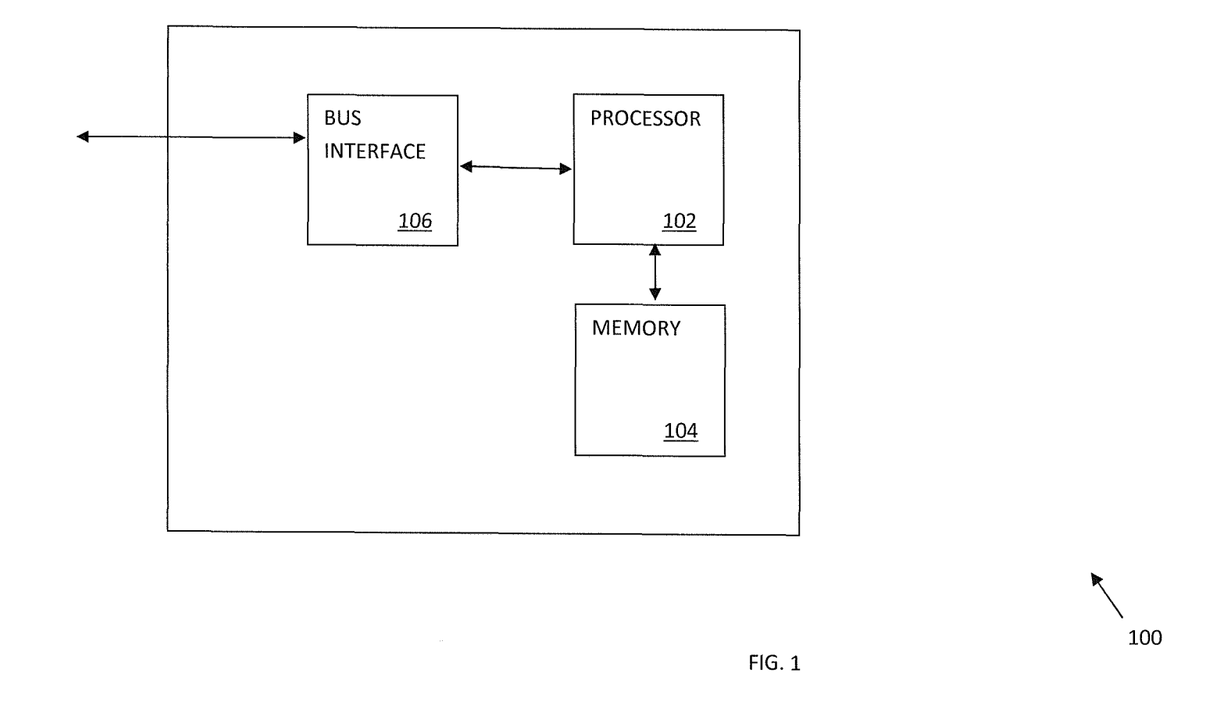
FIG. 1 is a logical block diagram of one exemplary audio source.

Referring now to FIG. 1, one exemplary audio source 100 is illustrated. As shown, the audio source includes a processor 102, a non-transitory computer readable memory 104, and a digital bus interface 106. The non-transitory computer readable memory 104 is in one implementation configured to store computer readable instructions for execution via the processor 102. In some variants, the non-transitory computer readable memory 104 includes one or more audio data. In other variants, the processor 102 is configured to receive one or more audio data from an external source e.g., via a network interface (not shown), another interface (such as an analog interface, or another digital bus interface), a microphone or other audio source, and/or the digital bus interface 106.

The processor 102 includes a central processing unit (CPU) or digital processor 102, such as a microprocessor, digital signal processor, field-programmable gate array (FPGA), array processor, or plurality of processing components mounted on one or more substrates. The processing subsystem may also include additional co-processors (not shown), such as a dedicated graphics accelerator, network processor, audio processor, etc.

The non-transitory computer readable memory 104 includes one or more memory elements which can be read from and/or written to. Common examples of memory elements include, without limitation: random access memory (RAM), static RAM (SRAM), dynamic ram (DRAM), synchronous DRAM (SDRAM), read only memory (ROM), electronically erasable programmable ROM (EEPROM), FLASH, magnetic storage media (e.g., hard disk drive (HDD)), etc.

The digital bus interface 106 includes one or more output driver terminals configured to transmit digital signals. In some variants, the digital bus interface 106 uses single-ended signaling which represents a digital signal as either a logic high voltage or a logic low voltage. Single-ended signaling can advantageously be implemented with as few as two (2) wires (signal and ground) thereby providing, inter alia, reduced manufacturing cost and form factor, and ostensibly enhanced reliability; however it is appreciated that additional terminals can be used to provide e.g., clock, enables, detect signaling, power, ground, additional channels of signal, etc. consistent with the disclosure In other variants, the digital bus interface 106 uses differential signaling which represents a digital signal as a relative difference between two complementary voltages (e.g., D+ and D−). As with single-ended signaling, differential signaling can be combined with e.g., clock, enables, detect signaling, power, ground, additional channels of signal, etc.

In one exemplary embodiment, the digital bus interface may be configured according to a tri-level signaling scheme which consists of logic high, logic low, and an undriven state (where the output driver terminal is not active). Tri-level signaling schemes require a tri-state driver terminal, and can be used in both single-ended signaling and differential signaling. In tri-level implementations, another coupled source can drive the bus while the tri-state driver is undriven.

Figure 2:
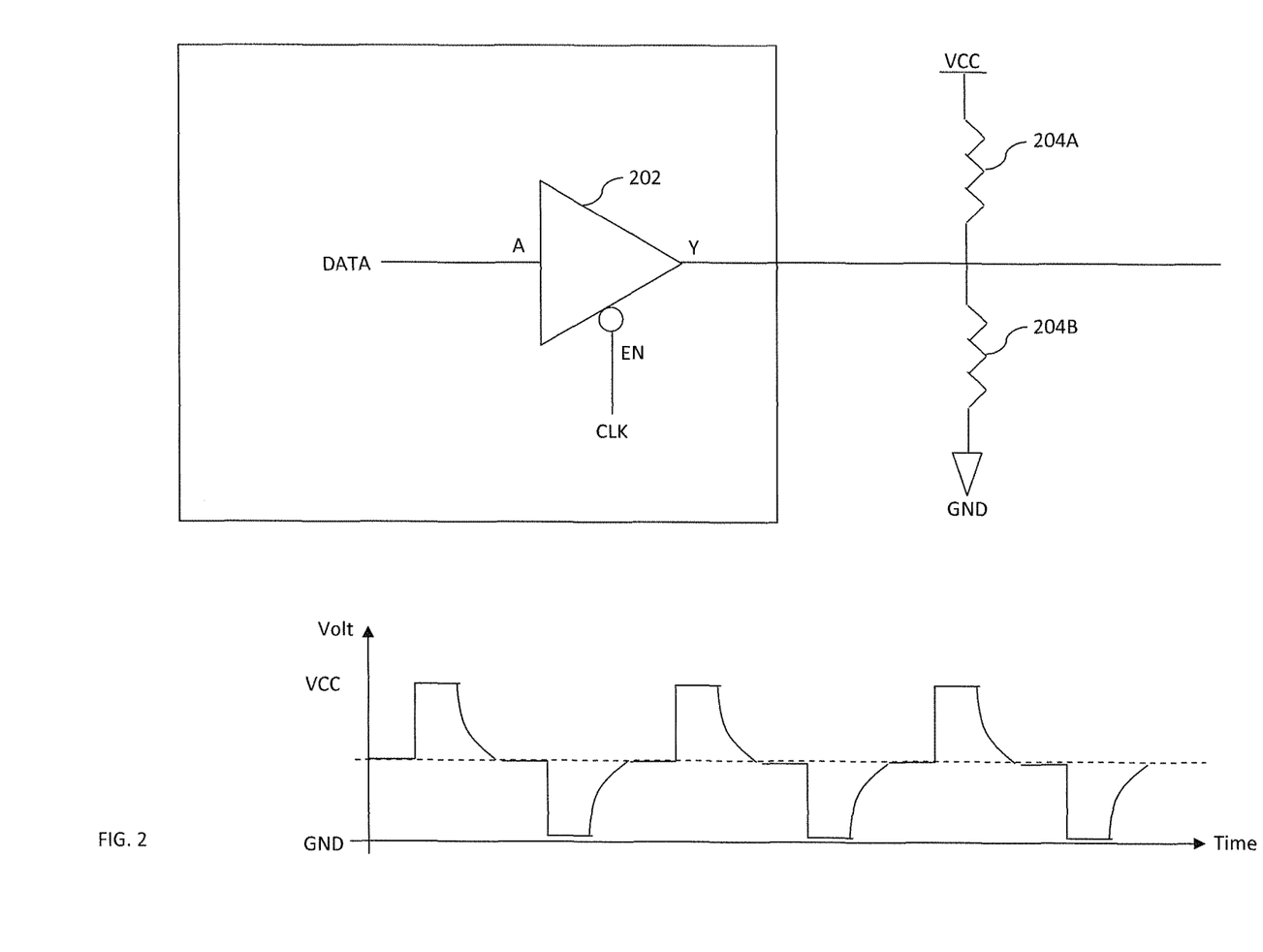
FIG. 2 is a logical block diagram of one simplified single-ended tri-level bus driver for use with the exemplary audio source of FIG. 1.

FIG. 2 illustrates one simplified single-ended tri-level bus driver for use with the exemplary audio source 100. As shown, the bus driver is a tri-state buffer 202 that receives an input signal (A) and an enable (EN) and produces an output (Y). The tri-state buffer 202 is described according to the following logic table, where "0" indicates a logic low, "1" indicates a logic high, and "Z" indicates an undriven state (high impedance):

TABLE 1

| A | EN | Y |
|---|----|---|
| 0 | 0  | Z |
| 1 | 0  | Z |
| 0 | 1  | 0 |
| 1 | 1  | 1 |

As shown in FIG. 2, the tri-level bus driver 202 is connected to a pull-up/pull-down voltage divider resistor configuration (204A, 204B). When the tri-state buffer is enabled, the output will drive a logic high or logic low signal; however, when the tri-state buffer is disabled, the high impedance state will cause the voltage to "float" according to the voltage divider circuit.

For clarity of illustration, one exemplary output waveform of the single-ended tri-level bus driver is shown. As illustrated, each clock edge (either rising or falling) represents a sample clock, whereas the voltage level determines the data value (either logic high or logic low). Practical implementations of the single-ended tri-level bus driver will exhibit a characteristic RC (resistive capacitive) first order decay once the tri-state buffer is disabled. In one implementation, the data value is determined by detecting the direction of the edge transition of the clock signal (e.g., rising or falling edge). The edge direction may be determined by any of a variety of means as would be recognizable by a person of skill. In one implementation, the edge direction is indicated by the logic level of the signal. For example, a high logic level (e.g., positive voltage) would be indicative of a rising edge transition, whereas a low logic level (e.g., negative voltage) would be indicative of a falling edge transition.

Figure 3:
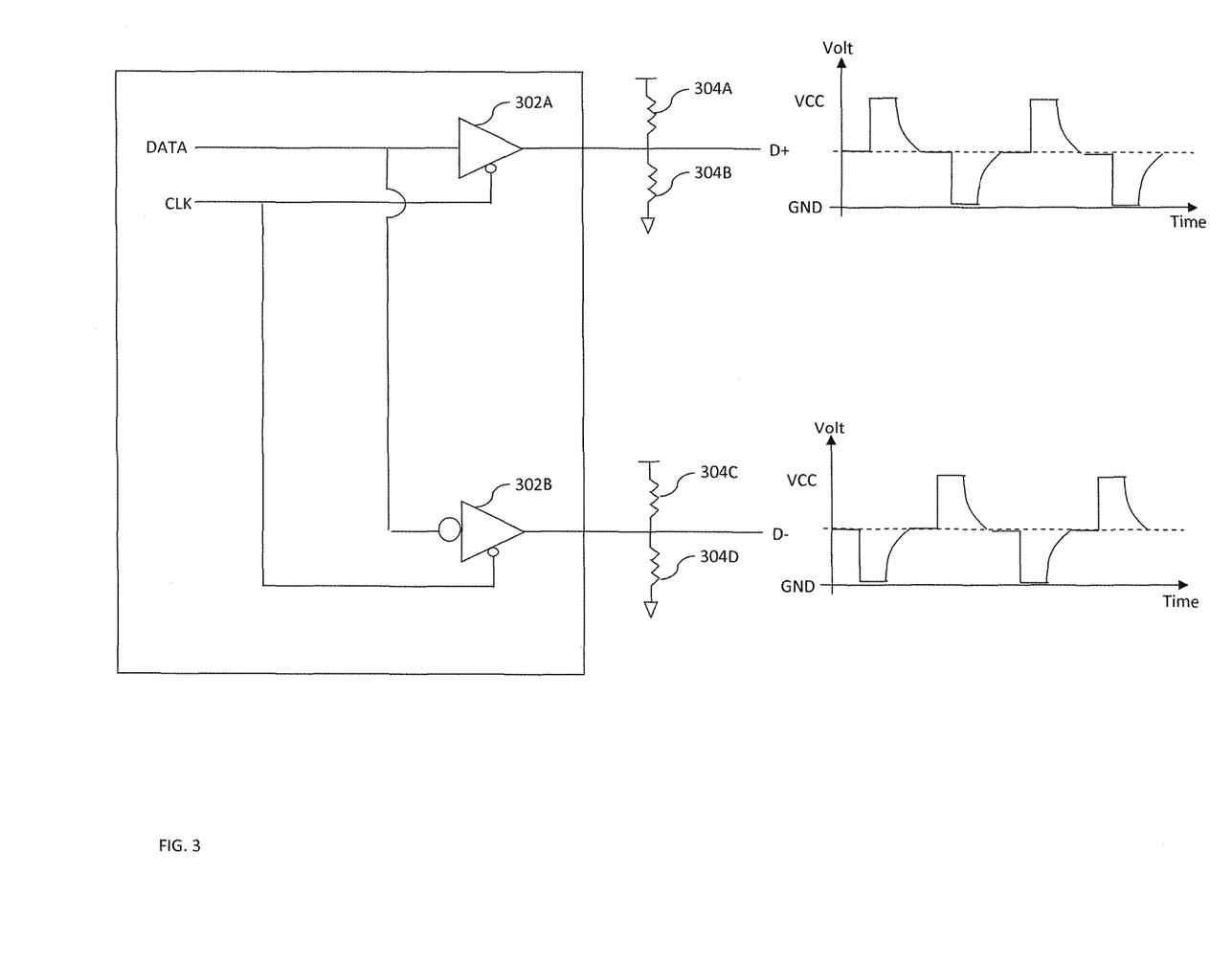
FIG. 3 is a logical block diagram of one simplified differential tri-level bus driver for use with the exemplary audio source of FIG. 1.

FIG. 3 illustrates one simplified differential tri-level bus driver for use with the exemplary audio source 100. As shown, the bus driver is a pair of complementary tri-state buffers (302A, 302B) that receives an input signal (A) and an enable (EN) and produces a pair of differential outputs (D+, D−). The complementary tri-state buffer 302 is described according to the following logic table:

TABLE 2

| A | EN | D+ | D− |
|---|----|----|----|
| 0 | 0  | Z  | Z  |
| 1 | 0  | Z  | Z  |
| 0 | 1  | 0  | 1  |
| 1 | 1  | 1  | 0  |

The differential tri-level bus driver circuits are connected to a pair of voltage divider resistor configurations (304A, 304B, 304C, 304D). Exemplary output waveforms of the differential tri-level bus driver are shown.

An apparatus which has both source and sink capabilities can implement bidirectional signaling with tri-state signaling (e.g., a first device drives a signal during a transmit time, and tri-states its output driver to receive signaling at other times). In other variants, audio data can be unidirectional from the source, but control data may be bi-directionally received from other connected nodes. In still other embodiments, bidirectional operation may be implemented with distinct and non-contentious signal terminals, or may be managed according to an internal (or external) bus arbiter (such as a hub, etc.).

Referring back to FIG. 1, in one exemplary embodiment, the digital bus interface 106 transmits a data signal and a clock signal. More complex variants may include additional data channels, control channels, error correction channels, clock recovery, etc. Those of ordinary skill in the related arts will recognize that various transmission protocols and formats may be used with the apparatus 100. Common examples of formatting requirements include, without limitation: fixed length and variable length packets, data frames, control frames, guard frames, data symbols, control symbols, and null symbols.

In one exemplary embodiment, the digital bus interface is based on time division multiplexing (TDM). In TDM bus transactions, each source node coupled to the bus is allocated one or more time slots during which the source node is the sole bus driver. For example, in one exemplary TDM scheme, a time interval (or time domain) is divided into several recurrent time slots of fixed length. In symmetric TDM schemes, each source is allocated the same number of time slots. In asymmetric TDM schemes, each source is allocated a number of time slots based on e.g., relative priority, etc. In some implementations, TDM signaling requires additional overhead signaling for e.g., synchronization, sufficient isolation, time slot request/grant, etc.

While TDM schemes are common within the digital bus arts, it is appreciated that other multiplexing or multiple access schemes may be readily substituted, given the contents of the present disclosure. Common examples of other multiplexing schemes include without limitation, frequency division multiplexing (FDM), orthogonal frequency division multiplexing (OFDM), code division multiplexing (CDM), etc.

Figure 4:
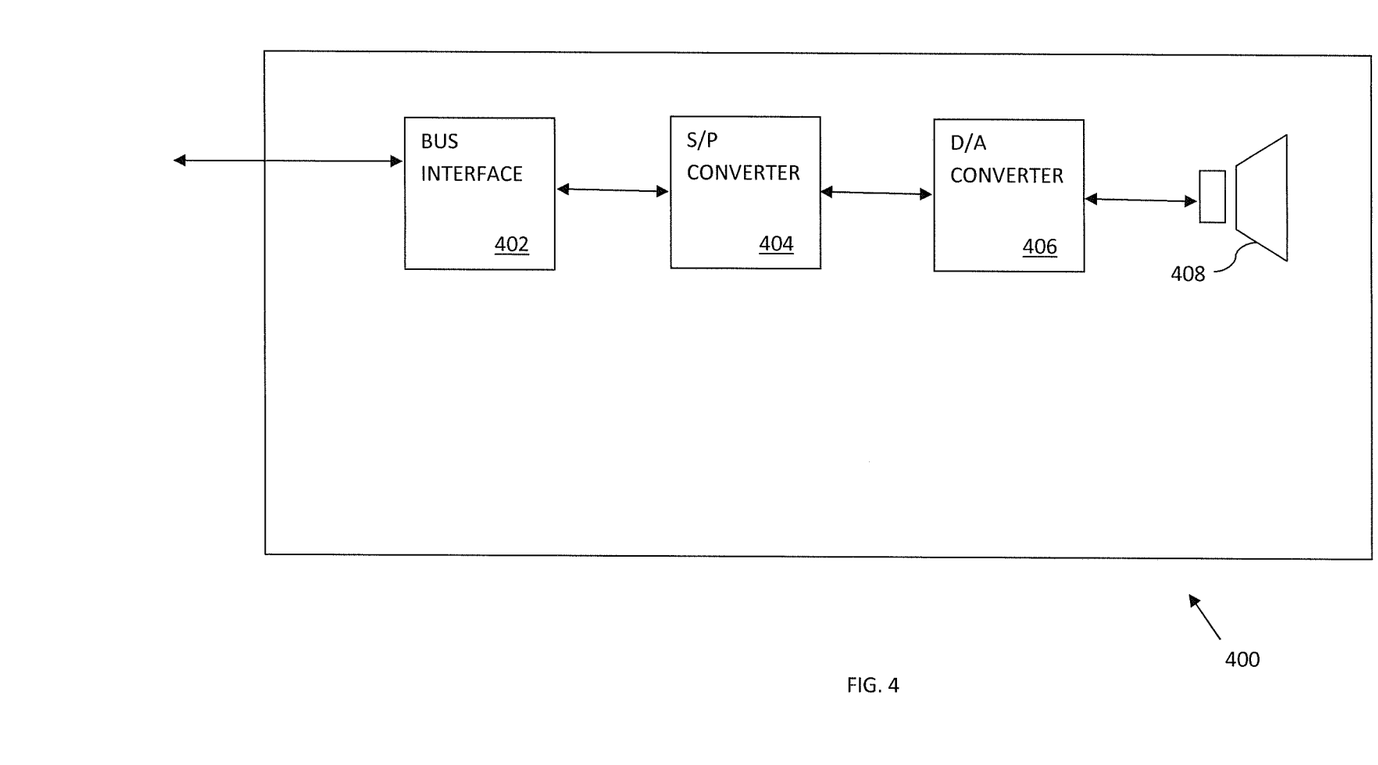
FIG. 4 is a logical block diagram of one exemplary audio sink.

Referring now to FIG. 4, one exemplary audio sink 400 is illustrated. As shown, the audio sink includes a digital bus interface 402, a serial to parallel converter 404, a D/A converter 406, and a speaker 408. In some embodiments, the audio sink may additionally include a processor and a non-transitory computer readable memory that is configured to store computer readable instructions for execution via the processor.

The digital bus interface 402 includes one or more input buffer terminals configured to receive digital signals. In some variants, the input buffers are single-ended, or alternately the input buffers may be differential inputs for differential busses.

Figure 5:
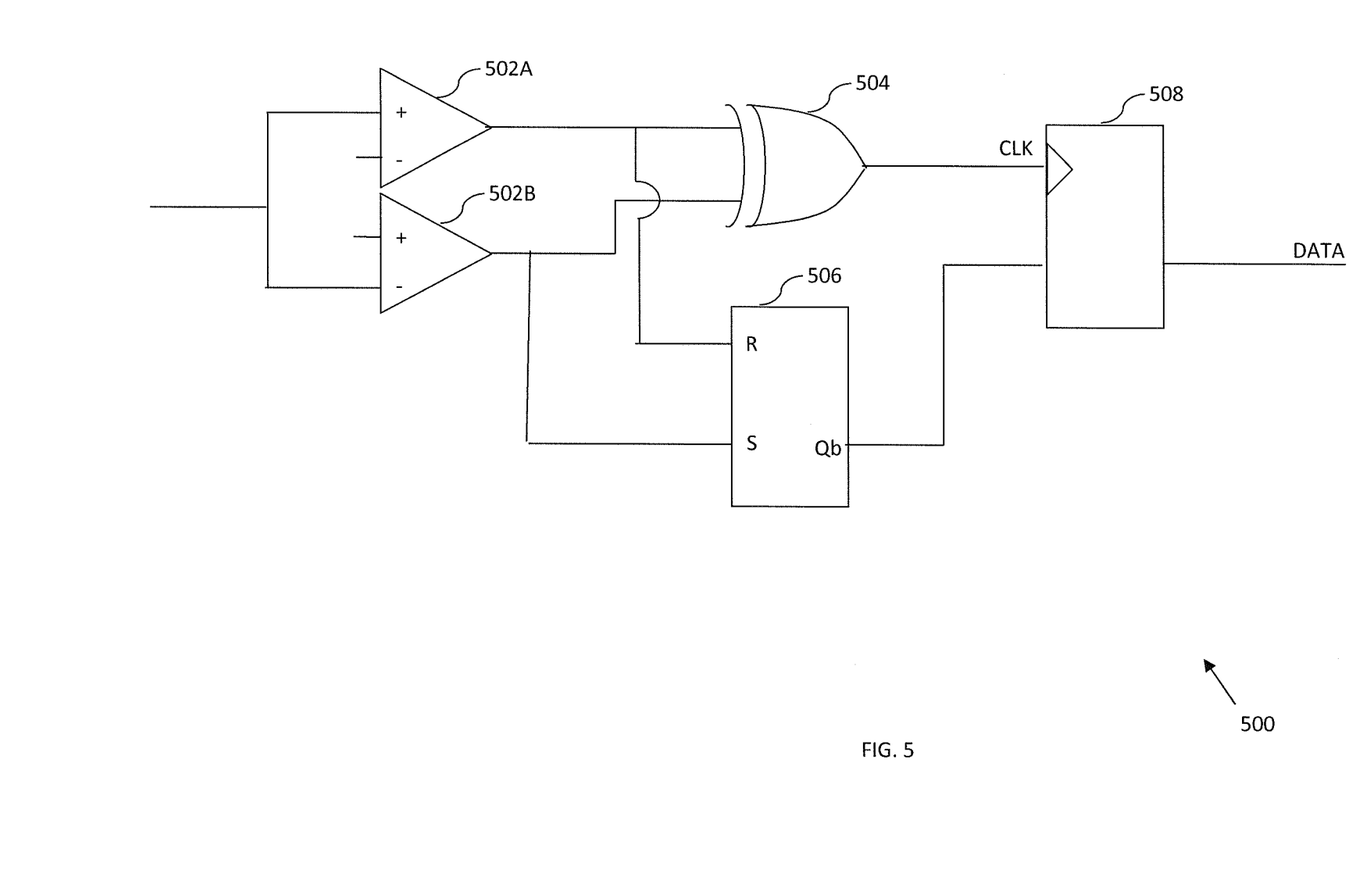
FIG. 5 is a logical block diagram of one exemplary configuration of a simplified clock and data recovery circuit for use with the exemplary audio sink of FIG. 4.

FIG. 5 illustrates a simplified representation of an exemplary clock and data recovery circuit 500, for use with an audio sink 400. As shown, the circuit includes a pair of complementary operational amplifiers (op-amps) (502A, 502B) which are configured to amplify a received input signal. As shown, the positive terminal of a first op-amp 502A and the negative terminal of a second op-amp 502B are tied to the input signal, whereas the negative terminal of the first op-amp 502A and the positive terminal of the second op-amp 502B are tied to a floating voltage (e.g., which is dictated by a voltage divider resistor configuration of any coupled sources). In this configuration, the first op-amp 502A amplifies the input signal to an appropriate logic high/logic low voltage, whereas the second op-amp 502B inverts and amplifies the input signal to a complementary logic low/logic high voltage. The outputs of the complementary op-amps are coupled to an exclusive-OR (XOR) logic gate 504 for clock recovery, and a reset/set (RJS) latch 506 in conjunction with a flip-flop 508 for data recovery.

The truth table for an XOR logic gate is presented in the TABLE 3 below.

TABLE 3

| A | B | Y |
|---|---|---|
| 0 | 0 | 0 |
| 1 | 0 | 1 |
| 0 | 1 | 1 |
| 1 | 1 | 0 |

Those of ordinary skill in the related arts will recognize that, for the sample waveform of FIG. 2, during each driven logic level (either logic high or logic low), the XOR logic gate will assert a logic high, whereas during un-driven levels the XOR logic gate will assert a logic low. Accordingly, the resulting output of the XOR logic gate is a recovered clock signal.

The reset/set (R/S) latch 506 only accepts a reset condition (R driven with logic high and S driven logic low, resulting in an inverted output ($Q_{bar}$) of logic high) or a set condition (R driven with logic low and S driven logic high, resulting in a $Q_{bar}$ of logic low). The flip-flop 508 stores and drives an output based on its input at the time of a clock edge. The resulting output of the flip-flop 508 is the recovered data signal.

While the simplified clock and data recovery circuit 500 is provided for a single-ended input, those of ordinary skill in the related arts will readily appreciate that a mirrored complementary circuit can be used with differential sources. Furthermore, it is appreciated that the foregoing circuit is merely illustrative of the various principles described herein, various other realizations may be constructed by artisans of ordinary skill, given the contents of the present disclosure.

Referring back to FIG. 4, the digital bus interface (such as the exemplary simplified clock and data recovery circuit 500) is directly coupled to a serial to parallel converter 404. Common implementations of a serial to parallel converter 404 may be performed with shift registers and varying degrees of logic. No serial to parallel converter 404 may be necessary in parallel bus embodiments (i.e., where each bit of the audio sample has its own dedicated wiring). More complex embodiments may incorporate logic and/or intelligence to provide advanced capabilities (e.g., multiple audio channels, audio networking, etc.). For example, in one embodiment, every eight (8) bits of serial data are converted to a byte of audio sample. In a more complex embodiment, every 8 bits of serial data are converted to a byte. The byte stream is further parsed by a local processor as portions of a packet or frame. The processor can determine if the packet or frame is applicable to the audio sink 400 by e.g., identifying the time slot, and extracting an audio sample that has been embedded within the packet or frame.

In one exemplary embodiment, the sink 400 incorporates a simple processor which can communicate with the audio source via bidirectional signaling. The communication capability allows the sink 400 to identify itself to the source 100, configure one or more settings, and in some cases transact data. For example, a headset may include sufficient logic to identify its manufacture, firmware version, and supported audio formats to the audio source. Based on the communication the audio source 100 can adjust its data rate to best suit the capabilities of the audio sink 400.

In other embodiments, the sink 400 may identify itself according to a hardcoded capability, or alternately the audio source may assume a minimum default functionality of the sink 400. For example, unless informed otherwise, the audio source may assume that an audio sink can receive a constant bit audio sample (e.g., 8-bit, 16-bit, 32-bit, etc.) over a single channel for audio reproduction within a fixed audible range (e.g., 20 Hz to 20 KHz).

The D/A converter 406 converts an audio sample into an analog voltage or current which is used to drive the speaker 408. Traditional implementations may further incorporate one or more amplifiers and/or gain stages to provide sufficient power to effect audio reproduction.

Example Digital Audio Bus—

Figure 6:
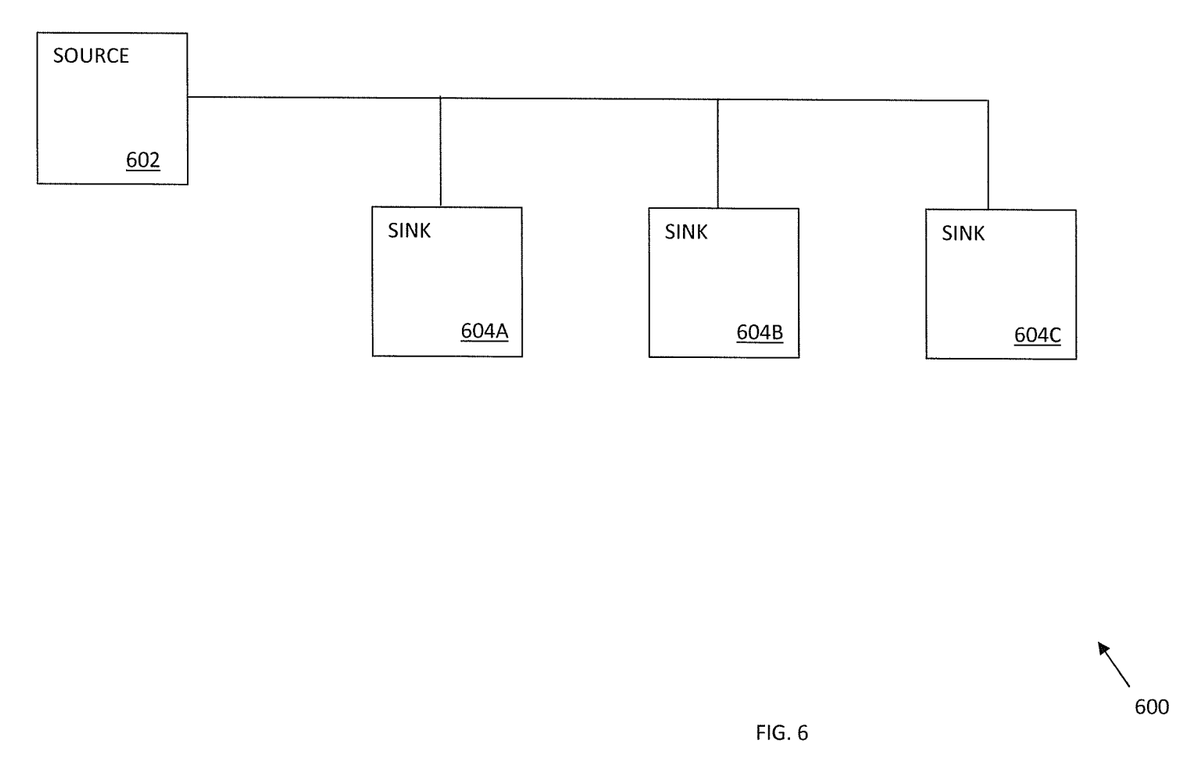
FIG. 6 is a logical block diagram representing one exemplary time-division multiplexing (TDM) bus, which is capable of bidirectional data transfer over multiple connected nodes ("multi-drop" capability), in accordance with the various principles described herein.

FIG. 6 is a logical block diagram representing one exemplary time-division multiplexing (TDM) bus, which is capable of bidirectional data transfer over multiple connected nodes ("multi-drop" capability). As illustrated, a first audio source 602 provides audio data via a unidirectional link to multiple audio sinks (604A, 604B, 604C). Each of the multiple audio sinks is further capable of transmitting control information to the audio source 602, which is useful for e.g., identification, addressing, multi-channel capability, etc.

During operation, the audio source 602 transmits one or more discovery requests. Responsively, each of the audio sinks (604A, 604B, 604C) responds with configuration information, including but not limited to: software version, available capabilities/restrictions, sink identifier, etc. Each node implements a contention-based access scheme, for instance each sink does not attempt to bus access during an active transaction, and if a collision is detected between two simultaneous access attempts, the sinks back-off for a randomized back-off period before re-attempting access.

After discovery, the audio source 602 configures each of the audio sinks in turn, using unique identifiers to uniquely address the appropriate sink. In some variants, the source may need to assign addresses on a first-come-first-serve basis (e.g., in systems where sinks do not have a unique identifier).

After initializing and configuring the audio sinks, the audio source transmits audio data in accordance with a media file according to assigned time slots. For instance, an audio device may transmit a first channel of audio data to the first sink (604A) during a first time slot, a second channel of audio data to the second sink (604B) during a second time slot, and a third channel of audio data to the third sink (604C) during a third time slot. In some implementations, the sinks may be additionally allocated an upstream timeslot for providing control feedback, and/or other uplink data.

Methods—

Figure 7:
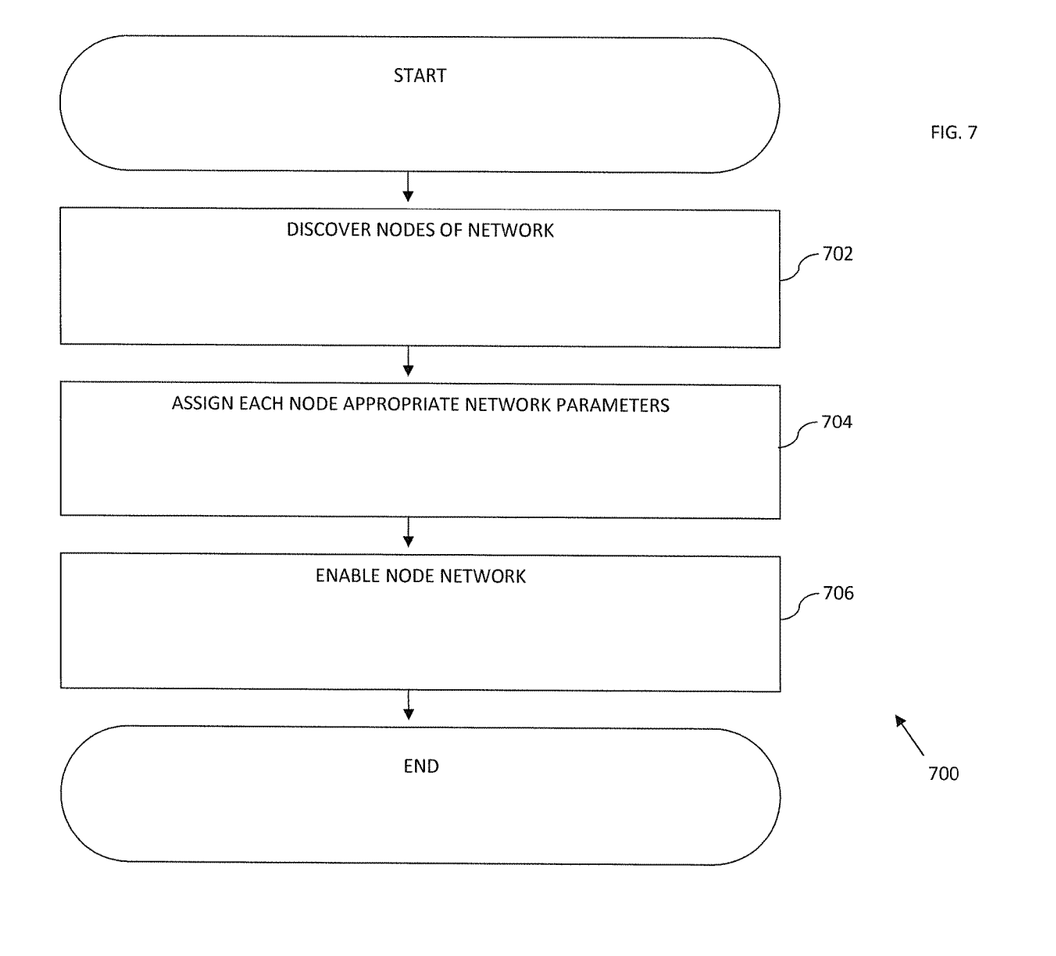
FIG. 7 is a logical flow diagram of one embodiment of a method for bidirectional audio bus operation, in accordance with the various principles described herein.

Referring now to FIG. 7, one generalized method for bidirectional audio bus operation is presented. In one exemplary embodiment, a network of audio sources and sinks are connected with a time-division multiplexing (TDM) bidirectional bus.

At step 702 of the method 700, each node of the network is discovered. In one embodiment, the discovery process is conducted during a discovery period. The discovery period can be triggered at e.g., power up, component wake-up, out-of-band notification, software discovery, etc.

In centrally managed embodiments, each node of the network attempts to register itself with at least one central node. In distributed embodiments, each node of the network must register itself with every other connected node. In still other embodiments, one or more nodes may need to arbitrate for control of the bus; i.e., the central node may be dynamically determined.

Moreover, it is appreciated that while discovery may be used, certain implementations may be configured in a "fixed" manner. Fixed embodiments may be useful for devices which do not significantly change in complexity (e.g., single source and sink devices, etc.).

At step 704 of the method 700, each node is assigned one or more network parameters. In centrally managed embodiments, the central node determines and assigns the network parameters. In distributed embodiments, each node of the network negotiates appropriate network parameters. In one embodiment, each node is assigned the one or more network parameters via a bidirectional communication link. The bidirectional communication link is configured to send and receive control data between the nodes of the network.

Common examples of network parameters include e.g., one or more assigned time slots, throughput and/or latency requirements, address assignment, prioritization, communication protocol, etc.

At step 706 of the method 700, the network is enabled for operation and data can be transacted. Once the network parameters are resolved, the network can be enabled. For example, once each node has been assigned an appropriate time slot for communication/data, the network can operate without further contention based issues.

Figure 8:
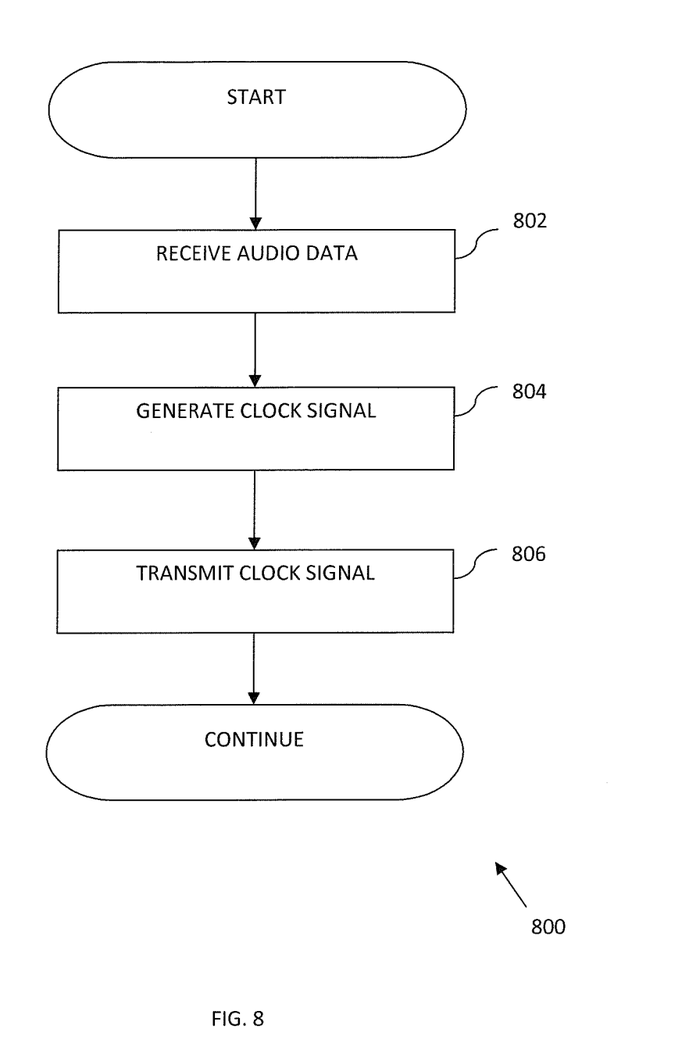
FIG. 8 is a logical flow diagram of one embodiment of a method of generating a clock signal for transmitting audio data over an audio bus, in accordance with the various principles described herein.

Referring now to FIG. 8, one embodiment of a method of generating a clock signal for transmitting audio data over an audio bus is presented. In one implementation, the configuration of the clock signal is indicative of the audio data being transmitted to a sink node.

At step 802 of method 800, audio data is received from a transmission over the audio bus. The audio data may be received from a variety of audio sources. For example, various internal components of a computerized or electronic device are configured to output audio data, such as an audio chipset. In addition, audio data may be received from components external to the computerized/electronic device via, for example, audio inputs which may be configured to receive analog signals or digital data. In analog signal embodiments, a received analog signal may be converted into a digital audio signal before further processing.

At step 804, a clock signal is generated in accordance with the received audio data. Each clock cycle of the clock signal is configured to indicate a respective value of the audio data. In one embodiment, the clock signal is furthered generated in accordance with the network enablement (step 706 of FIG. 7). For example, each node of the audio network may be allocated time slots for receiving and/or transmitting data. Accordingly, each time slot of the generated clock signal will be generated to transmit audio data to a node at a node's assigned clock cycles. By configuring the clock signal according to assigned time slots, audio data may be provided to a plurality of nodes in any particular clock cycle period.

In one implementation, the voltage level of the clock signal is based on a corresponding value of audio data. For example, if a bit of audio data with a value of "1" is received; the generated clock signal is generated at a high voltage level. If a bit of audio data with a value of "0" is received, the generated clock signal is generated at a low voltage level. In another implementation, the value of a bit of received audio data generates a clock cycle beginning with an edge transition of either a rising edge or falling edge, depending on the bit value of the received audio data.

At step 806, the generated clock signal is transmitted over the audio bus. In one embodiment, the generated clock signal is transmitted in accordance with the network enablement (step 706). For example, certain time slots of the audio bus may be enabled to receive data at a node generating the clock signal. Accordingly, for those time slots allocated to receive data over the audio bus, transmission of the generated clock signal is halted until the next scheduled time slot for data transmission to a node occurs.

Figure 9:
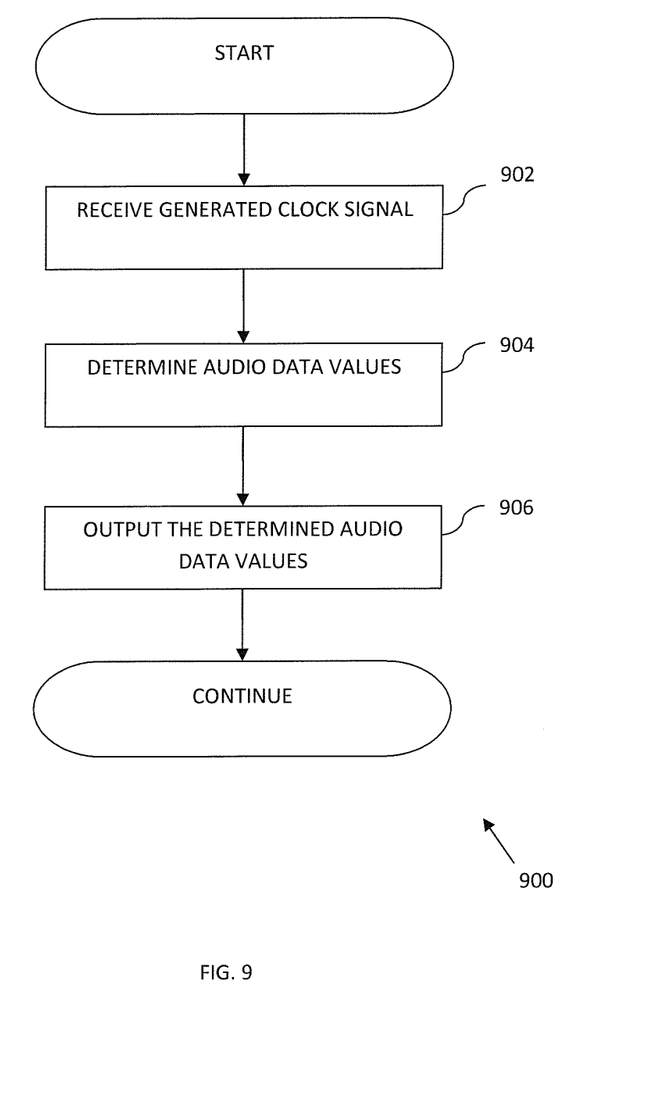
FIG. 9 is a logical flow diagram of one embodiment of a method of a node deriving audio data from a clock signal received over an audio bus, in accordance with the various principles described herein.

Referring now to FIG. 9, one embodiment of a method of a node deriving audio data from a clock signal received over an audio bus is presented. In one implementation, the clock signal is transmitted by a source device over an audio bus connected to a plurality of sink devices.

At step 902 of the method 900, the node receives a generated clock signal over the audio bus. The generated clock signal may contain audio data for a plurality of nodes. In such embodiments, the node may be configured to distinguish which portions of the received clock signal comprise data for the respective node. In one implementation, transmission of the audio bus is configured according to a time-division multiplexing (TDM) scheme. Each node may be assigned with a number of time slots of a clock cycle used for receiving audio data. Accordingly, once the node is aware of the node's respective time slots, the node monitors the received clock signal during the assigned time slots.

At step 904, the node determines the audio data values from the received clock signal. The clock signal is in this implementation configured to indicate a data value of the audio data at each clock cycle. Using the edge transition of the clock to determine timing, in addition to being able to derive the audio data from the clock signal itself, the node is able to receive the transmitted audio data.

In one embodiment, the node determines a data value for a clock cycle associated with an assigned time slot. In another embodiment, the node determines the value of every clock cycle of the received clock signal. However, the data values of time slots which are not assigned to the respective node are ignored or discarded. In one implementation, the voltage level of the clock cycle is used to determine the data value. In another implementation, the node is configured to detect the direction of the edge transition of the clock cycle (e.g., rising or falling edge) to determine the data value of the clock cycle.

At step 906, the determined audio values are outputted for further processing. In one embodiment, the determined audio data values are modified as part of the output process. For example, the clock speed of the generated clock signal may be different than the clock speed used to process the determined audio data, Accordingly, the clock speed of determined audio data (i.e. the clock speed of the generated clock signal) may be scaled to correspond to the requisite audio data clock speed (for example by clock speed division).

One salient advantage of using the clock signal itself to indicate audio data, is that the use of other timing apparatus such as phase locked loops (PLLs) or delay locked loops (DLL) may be obviated, as there is no need to correlate timing between separate clock and data signals.

It will be recognized that while certain embodiments are described in terms of a specific sequence of steps of a method, these descriptions are only illustrative of the broader methods of the present disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the principles disclosed and claimed herein.

While the above detailed description has shown, described, and pointed out novel features of the various embodiments, it will be understood that various omissions, substitutions, and changes in the form and details of the device or process illustrated may be made by those skilled in the art. The foregoing description is of the best mode presently contemplated of carrying out the principles described herein. This description is in no way meant to be limiting, but rather should be taken as illustrative of the general principles. The scope of the present disclosure should be determined with reference to the claims.

What is claimed is:

1. A digital bus architecture within a given bus node of a plurality of bus nodes, comprising:
   a time-division multiplexing (TDM) signaling protocol configured to transmit a clock signal comprising real-time digital data, the clock signal configured to enable multi-drop connectivity for the real-time digital data over a bus interface; and
   the bus interface comprising a tri-level signaling scheme, the tri-level signaling scheme being configured to enable the given bus node to provide the clock signal and the real-time digital data to a plurality of other ones of the plurality of bus nodes;
   wherein a data value of the real-time digital data at a time slot of the clock signal is indicated by a voltage level of the clock signal at the time slot;
   wherein the tri-level signaling scheme is configured to enable a contention-based access to the bus interface;
   wherein each of the plurality of bus nodes is configured to communicate with one another to select which of the plurality of bus nodes comprises the given bus node, the selected given bus node being configured to provide the real-time digital data to the plurality of other bus nodes;
   wherein the contention-based access comprises a configuration of the plurality of bus nodes, the configuration of the plurality of bus nodes comprising an assignment of a corresponding time slot to each one of the plurality of other bus nodes; and
   wherein subsequent to the configuration of the plurality of bus nodes, the given bus node is further configured to provide the real-time digital data to each one of the plurality of other bus nodes in accordance with the corresponding time slot assigned to each one of the plurality of other bus nodes.

2. The architecture of claim 1, wherein the tri-level signaling scheme is further configured to enable the bus node to receive the clock signal from any of the plurality of other bus nodes.

3. The architecture of claim 2, wherein the real time digital data comprises digital audio data having one or more quality of service requirements associated therewith.

4. The architecture of claim 2, wherein a data value of the real-time digital data is derived from a clock cycle of the clock signal.

5. The architecture of claim 2, wherein signaling of the tri-level signaling scheme is selected from a group consisting of: (i) single-ended signaling and (ii) differential signaling.

6. The architecture of claim 1, wherein each of the plurality of other bus nodes is configured to transmit control information to the given bus node;
   wherein each of the plurality of other bus nodes is allocated an upstream time slot for the transmission of the configuration information to the given node.

7. The architecture of claim 1, wherein the provision of the real-time digital data to each one of the plurality of other bus nodes in accordance with the corresponding time slot comprises provision of a first segment of audio data to a first one of the other bus nodes during a first time slot and provision of a second segment of audio data to a second one of the other bus nodes during a second time slot.

8. The architecture of claim 1, wherein the given bus node is further configured to provide a corresponding segment of the real-time digital data to each one of the plurality of other bus nodes in accordance with the corresponding time slot assigned to each one of the plurality of other bus nodes.

9. A method of operating a digital audio network comprising a plurality of bus nodes, wherein each bus node comprises one or more audio sources and/or one or more audio sinks, the method comprising:
   arbitrating for control of the digital audio network, the arbitrating comprising dynamically determining which of the plurality of bus nodes comprises a central node;
   receiving audio data to be transmitted to multiple other ones of the plurality of bus nodes of the digital audio network;
   transmitting, based on the dynamic determining of which of the plurality of bus nodes comprises the central node, the audio data in accordance with time slots assigned to the multiple other ones of the plurality of bus nodes;
   transmitting a real-time clock signal with edge transitions and logic levels; and causing each edge transition of the real-time clock signal to convey a clock cycle of the received audio data, and causing each logic level of the real-time clock signal associated with the clock cycle to convey the received audio data.

10. The method of claim 9, wherein the transmitting of the real-time clock signal comprises transmitting the real-time clock signal to any of the plurality of bus nodes of the digital audio network.

11. The method of claim 9, wherein the transmitting comprises transmitting in accordance with a tri-level signaling scheme.

12. The method of claim 9, wherein the transmitting further comprises transmitting control data over a bidirectional link and transmitting the real-time clock signal over a unidirectional link.

13. The method of claim 9, wherein the arbitrating comprises allocating one or more time slots to at least one bus node for the transmitting.

14. The method of claim 9, wherein the transmitting of the real-time clock signal with the edge transitions and the logic levels comprises using the real-time clock cycle to convey the received audio data; and
wherein the using of the real-time clock cycle to convey the received audio data comprises conveying the received audio data without using a timing circuit.

15. A simplified digital data interface, comprising:
a two-wire signaling conductor interface;
logic configured to implement a time-divided transmission protocol over the conductor interface so as to enable single-ended signaling for the reception of digital audio data; and
logic configured to detect a collision between two or more attempts at the reception of the digital audio data, and based on the detected collision, to wait a randomized period of time before allowing another attempt at the reception of the digital audio data;
wherein:
the digital audio data is transmitted in the form of a clock signal comprising a plurality of clock cycles;
the logic is further configured to derive a data value of the digital audio data from a logic level of the clock signal at a respective clock cycle of the plurality of clock signals; and
the time-divided transmission protocol is configured to enable transmission of the digital audio data in accordance with time slots assigned to one or more audio sinks, the clock signal being generated based on the assigned time slots.

16. The simplified digital data interface of claim 15, wherein:
the simplified digital data interface is assigned one or more time slots of the clock signal; and
data values are derived from the clock signal for the cycles that correspond with the assigned one or more time slots.

17. The simplified digital data interface of claim 15, wherein the one or more audio sinks comprise multiple bus nodes, each of the multiple bus nodes having an address assigned by an audio source.

18. The simplified digital data interface of claim 17, wherein:
the time-divided transmission protocol is further configured to enable transmission of the digital audio data in accordance with time slots assigned to the multiple audio sinks; and
the transmission of the digital audio data in accordance with time slots assigned to the multiple audio sinks comprises transmission of (i) a first channel of the digital audio data to a first audio sink during a first assigned time slot, (ii) a second channel of the digital audio data to a second audio sink during a second assigned time slot, and (iii) a third channel of the digital audio data to a third audio sink during a third assigned time slot.

* * * * *